D. KAUFMAN.
Combined Thrashing Machine and Straw Cutter.
No. 46,474.
Patented Feb. 21, 1865.
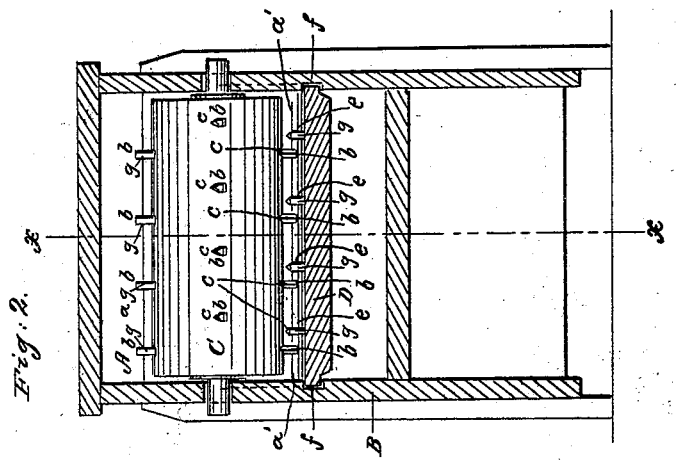
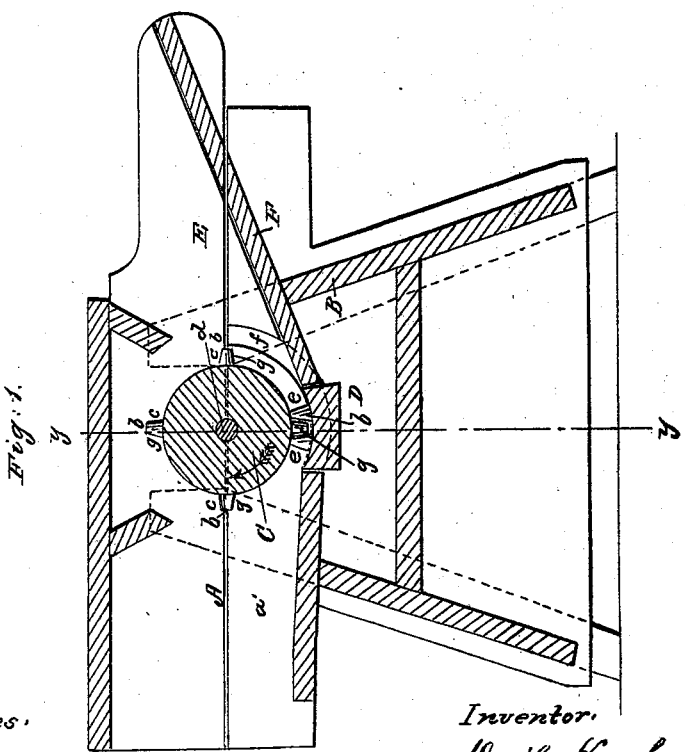
Witnesses:
Henry Morris.
Geo W Reed.
Inventor:
Danl. Kaufman
per Munn & Co.
Attorneys.

UNITED STATES PATENT OFFICE.

DANIEL KAUFMAN, OF BOILING SPRINGS, PENNSYLVANIA

COMBINED THRASHING-MACHINE AND STRAW-CUTTER.

Specification forming part of Letters Patent No. 46,474, dated February 21, 1865.

*To all whom it may concern:*

Be it known that I, DANIEL KAUFMAN, of Boiling Springs, in the county of Cumberland and State of Pennsylvania, have invented a new and useful Combination of a Fodder-Cutter and Thrashing-Machine; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, Fig. 2; Fig. 2, a transverse vertical section of the same, taken in the line $y\ y$, Fig. 1.

Similar letters of reference indicate like parts.

This invention consists in the employment or use of a rotating cylinder provided with teeth beveled or brought to an edge at one side, in combination with a concave provided with similar teeth and placed below the cylinder, said parts being placed within a suitable box or case, and arranged in such a manner that the device may be changed from a fodder-cutter to a thrashing-machine, and vice versa, by simply reversing the position of the cylinder and concave.

A represents a case or box open at both ends and supported upon a suitable frame, B. This box is made in two parts, $a\ a'$, the part $a$ being fitted on $a'$ so that the former may be removed when necessary.

C is a cylinder, which is fitted transversely in the box A, and is provided at its periphery with teeth $b$, which are beveled at one side to form sharp or cutting edges $c$. These teeth may be arranged longitudinally on the cylinder parallel with its shaft $d$.

D is a concave, which is placed below the cylinder C, and provided with similar teeth, $e$, which are rather out of line with the teeth $b$ of the cylinder C, in order that the teeth $b$ may pass the teeth $e$ of the concave as the cylinder C is rotated. The ends of the concave D are fitted in segment-grooves $f$, made in the sides of the box A, to admit of the ready removal of the concave from the box and its ready insertion therein.

E is the feed end of the box A, and F an inclined board or chute which forms the bottom of said end. This board or chute F is fitted in grooves in the sides of the box A, so that it may slide therein. The sides of the teeth $b\ e$ of the cylinder and concave opposite to those which are beveled or sharpened are made broad or blunt, as shown at $g$ in Fig. 2.

When the device is used as a fodder-cutter, the cylinder C and concave D are placed in such a relative position with each other that the sharp edges of the teeth $b$ of the cylinder will work past the sharp edges of the teeth of the concave, and the fodder be cut expeditiously and in a perfect manner. In order to convert the device into a thrashing-machine, the cylinder C is reversed in position as well as the concave D, which causes the broad sides $g$ of the cylinder-teeth $b$ to work past the broad sides of the teeth of the concave, and an efficient thrashing-machine is obtained.

I would remark that in addition to the teeth $b\ e$ of the cylinder and concave, spikes may be used, the teeth and spikes being combined both on the cylinder and concave.

I claim as new and desire to secure by Letters Patent—

The combination of the toothed cylinder C and toothed concave D, arranged so as to be capable of being reversed in position, and provided with teeth beveled or sharpened at one side and broad or blunt at the opposite side, to form a combined fodder-cutter and thrashing-machine, substantially as set forth.

DANIEL KAUFMAN.

Witnesses:
H. E. BRECHBILL,
J. A. KAUFMAN.